United States Patent [19]

Rossberg et al.

[11] Patent Number: 4,660,972
[45] Date of Patent: Apr. 28, 1987

[54] ARRANGEMENT FOR VISUALIZING THE CORES OF OPTICAL WAVEGUIDES

[75] Inventors: Rolf Rossberg, Schwieberdingen; Peter Schmid, Tamm, both of Fed. Rep. of Germany

[73] Assignee: International Standard Electric Corporation, New York, N.Y.

[21] Appl. No.: 710,832

[22] Filed: Mar. 12, 1985

[30] Foreign Application Priority Data

Mar. 13, 1984 [DE] Fed. Rep. of Germany ....... 3409043

[51] Int. Cl.⁴ ...................... G01B 11/27; G01N 21/01
[52] U.S. Cl. .................................. 356/73.1; 356/153
[58] Field of Search .................. 356/73.1, 390, 384, 356/385, 153

[56] References Cited

U.S. PATENT DOCUMENTS

| | | | |
|---|---|---|---|
| 3,932,042 | 1/1976 | Faani et al. | 356/390 X |
| 3,947,129 | 3/1976 | Wiklund | 356/385 |
| 4,492,463 | 1/1985 | Marcuse et al. | 356/73.1 |
| 4,506,947 | 3/1985 | Tatekura et al. | 356/73.1 X |
| 4,565,593 | 1/1986 | Marr | 356/73.1 X |

FOREIGN PATENT DOCUMENTS

| | | | |
|---|---|---|---|
| 2855598 | 7/1980 | Fed. Rep. of Germany | 356/73.1 |
| 3247954 | 6/1984 | Fed. Rep. of Germany | 356/73.1 |

*Primary Examiner*—Vincent P. McGraw
*Attorney, Agent, or Firm*—John T. O'Halloran; Mary C. Werner

[57] ABSTRACT

The spatial position of the core of an optical waveguide (1) can be observed exactly in that the optical waveguide is irradiated, in two mutually perpendicular directions, with parallel light, which thereafter passes through each time one rod lens (31, 32) and into a deflecting optical system (8, 9, 10). With the aid of this deflecting optical system it is possible to produce two side-by-side images of the optical waveguide and its core. With the aid of such an arrangement the cores of two optical waveguides to be joined, can be optically aligned with respect to each other in a simple way.

19 Claims, 11 Drawing Figures

ARRANGEMENT FOR VISUALIZING THE CORES OF OPTICAL WAVEGUIDES

BACKGROUND OF THE INVENTION

The invention relates to an arrangement for visualizing the cores of optical waveguides by employing rod lenses.

One such arrangement is known from DE-OS No. 33 11 472. By that arrangement, the optical waveguide or the fiber preform, for determining the index profile, is illuminated with a diverging bundle of rays which is produced with the aid of a rod lens disposed parallel in relation to the optical waveguide.

For the joining of optical waveguides it is necessary to align them in relation to one another so as to permit a passage of the radiation from one optical waveguide to the other with a low as possible loss. Relative thereto, the optical waveguides which, for example, have a fiber diameter of 125 μm, must be aligned in such a way with one another that the optical axes thereof are in agreement. As a rule, this is effected in that the optical waveguides to be joined are aligned in relation to one another with the aid of a microscope, by observing their outer contours.

In many cases, however, such an alignment is not exactly enough, especially in the case of monomode fibers with which, owing to their smaller core radius, already small deviations of the core center from the fiber center, lead to a relatively high attenuation. An exact alignment of the fiber cores in relation to one another can be effected in that light is permitted to enter into the optical waveguide from its free end, with the light as emerging from the free end of the other optical waveguide being observed. The ends of the two optical waveguides to be joined are then displaced in relation to one another until a maximum light passage is achieved at the joint. This method, however, is circumstantial and requires the two remote ends of the optical waveguides to be accessible.

It is the object of the present invention to provide an optical arrangement for visualizing the cores of optical waveguides, which is of a relatively simple construction and permits the cores of the two optical waveguides to be aligned in relation to one another at the splicing point without the remote ends of the optical waveguides having to be accessible.

SUMMARY OF THE INVENTION

This object and others which will become apparent hereinafter are accomplished by the present invention which provides an optical fiber apparatus comprising an optical waveguide having a core therein, an irradiation source mounted adjacent the waveguide to provide light rays to the waveguide along mutually perpendicular light paths which pass through the waveguide, two optical elements, each positioned in a respective light path between the irradiation source and the waveguide, each of the elements receiving light rays from the respective source and transmitting the rays in a parallel bundle to the waveguide, two rod lenses, each being positioned in a respective light ray path emerging from the waveguide, and means for deflecting the light rays emerging from the rod lenses so that the lengths of the light paths of both rays are substantially the same and produce two adjacent images in order to determine the spatial position of the waveguide and the core.

The invention starts out from the arrangement as disclosed in DE-OS No. 33 11 472, by which there is ascertained the index profile of fiber preforms and optical waveguides, with the illumination of the fiber preform or the optical waveguide being effected with the aid of a cylindrical rod lens. Apart from determining the index profile, this arrangement can also be used for detecting the core-cladding limits in the optical waveguide. For this purpose, however, the distance between the optical waveguide and the rod lens must be chosen to be smaller than the one mentioned in the DE-OS No. 33 11 472.

In distinction to the conventional arrangement, however, there is not carried out in this case an illumination with the aid of a diverging bundle of rays but, instead, the optical waveguide is illuminated with parallel light. The light as emerging from the optical waveguide then passes through a rod-shaped lens disposed parallel in relation to the optical waveguide, and the light as emerging from the rod lens is observed through a suitable optical system. Such an arrangement offers the advantage that the rod lens provides an additional enlargement.

The arrangement according to the invention, however, is not only restricted to the illumination of the optical waveguide from one direction but, in fact, there is effected an illumination from two mutually perpendicular directions, so that two images of the optical waveguide and its core are obtained. With the aid of a deflecting optical system, the two images are represented next to each other.

In this way it is possible to sharply define the two images next to each other in the viewing optical system. Accordingly, each time two images from viewing angles vertical in relation to one another are produced of the two ends of the optical waveguides to be joined, with the cores of the optical waveguides. being made visible. Thus, it is possible in a simple way, by displacing the one optical waveguide in two mutually perpendicular directions, to carry out an exact alignment of the two ends of the optical waveguides with respect to their cores without it being necessary for the remote ends of the optical waveguides to be accessible.

The arrangement according to the invention, however, is not only suitable for adjusting monomode fibers, but also for adjusting multimode fibers, in the core center of which there exists a break in the refractive index.

BRIEF DESCRIPTION OF THE DRAWING

The invention will now be explained in greater detail with reference to FIGS. 1 to 7 of the accompanying drawings, in which.

DESCRIPTION OF THE PREFERRED EMBODIMENT

Figure 1:
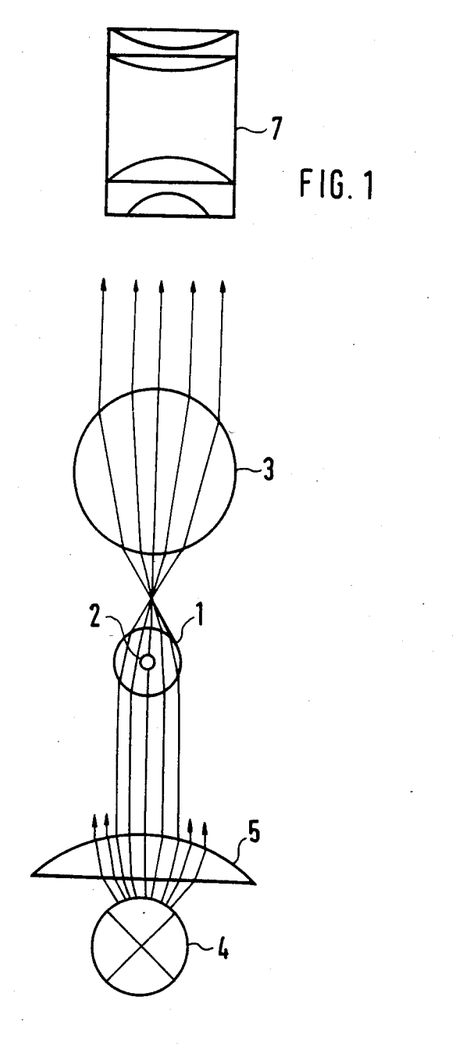
FIG. 1 in a schematical representation, shows the optical path in the arrangement according to the invention.

In the arrangement according to the invention, the optical waveguide is illuminated with parallel light. This light is supplied by a light source 4 (FIG. 1) and is directed in parallel through an illuminating optics 5. The optical waveguide 1 with its core 2 is followed by the rod lens 3 disposed parallel in relation to the optical waveguide 1. FIG. 1 shows the sectional view of the optical waveguide 1 and of the lens 3. The light rays as emerging from the lens 3 are observed with the aid of a suitable viewing optical system 7, for example, a microscope. Preferably, the radius of the rod lens 3 is approximately double as large as the radius of the optical waveguide 1. For example, the optical waveguide 1 may have a radius of 62.5 um whereas the lens 3 may have a radius of 125 um. With the aid of the arrangement there is achieved an additional enlargement with respect to the conventional arrangement in which the optical waveguide is irradiated with a diverging light produced through a cylindrical lens.

Figure 2:
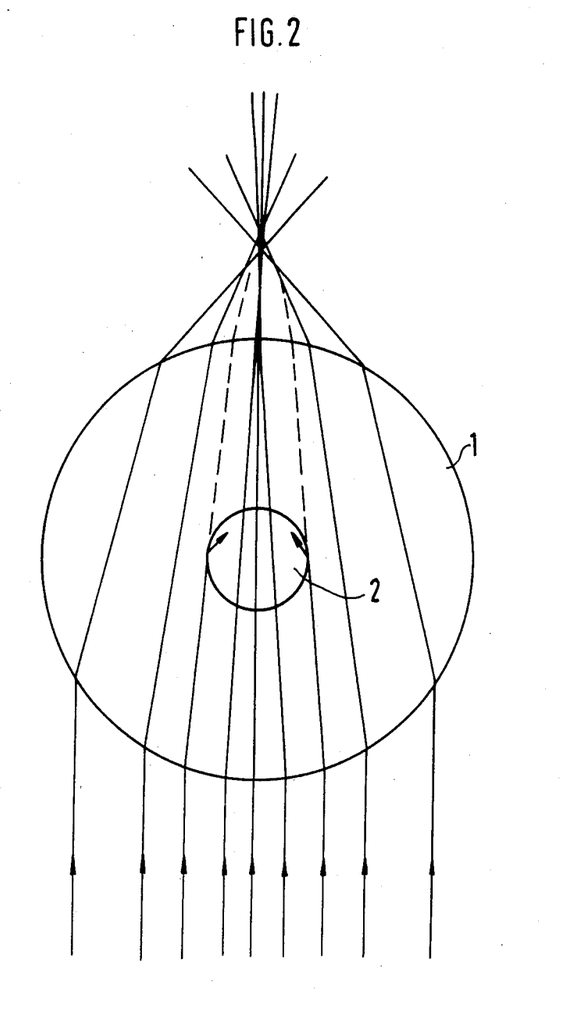
FIG. 2 shows the optical path through the optical waveguide.

FIG. 2 schematically shows the optical path as passing through the optical waveguide 1. The light rays as entering into the optical waveguide 1 and extending parallel in relation to one another, are deflected in the optical waveguide 1 toward the core and, when emerging from the optical waveguide 1, are deflected in such a way as to intersect each other in a plane which is perpendicular to the optical waveguide. The light rays tangentially touching the core 2 are refracted into the interior of the core. Therefore, the boundary between the optical waveguide 1 and the core 2 becomes visible as a shadow in the viewing optical system 7 (FIG. 1), with this being denoted by the dashlines in FIG. 2.

Figure 3A:
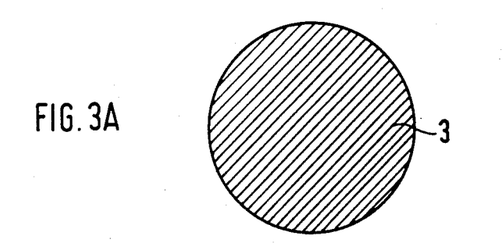
FIGS. 3A-3D show various cross sectional shapes relating to the rod lenses which are disposed in the light path behind the optical waveguide, FIGS. 4 and 5, schematically show two different optical arrangements for producing two images of an optical waveguide from two mutually perpendicular directions, with the aid of prisms, FIG. 6 schematically shows an optical arrangement for producing two images of an optical waveguide from two mutually perpendicular directions, with the aid of a roof prism.

The rod lens as disposed in the light path behind the optical waveguide, is preferably designed as a cylindrical lens, but does not need to have a complete cylinder jacket surface. FIG. 3 shows various possible cross sections for such a rod lens. The cross section as shown in FIG. 3A represents a circular area; accordingly, there is concerned a cylindrical lens.

Figure 3B:
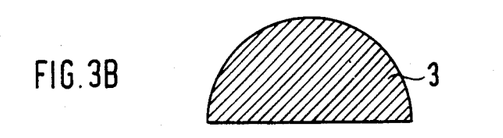

As can be seen from the cross section of the rod lens as shown in FIG. 3B, this lens has a plano-convex shape.

Figure 3C:
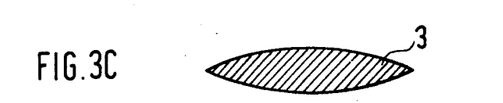

The rod lens 3, however, may also be of a biconvex (double convex) design, as can be seen from the cross section shown in FIG. 3C.

Figure 3D:
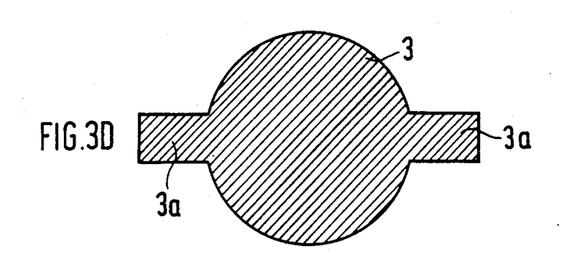

The lens whose cross section is shown in FIG. 3D, is a cylindrical lens 3 which, in the longitudinal direction, has two oppositely arranged extensions 3a. These extensions 3a, for example, may be used for holding the lens in position.

The cross section of the rod lens, however, may also have a shape other than a circular one. With an aspherical (non-spherical) shape of the rod lens it is possible to obtain an improved image quality. Aspherical shapes are, for example, parabola, hyperbola, or ellipse sections or complete ellipses.

In the following arrangements according to the invention, described with reference to FIGS. 4 to 7, the optical waveguide, for being aligned, is irradiated with parallel light from two mutually perpendicular directions, with two juxtaposed images of the optical waveguide and of the core being produced with the aid of two rod lenses disposed parallel in relation to the optical waveguide, and a suitable viewing optical system.

Figure 4:
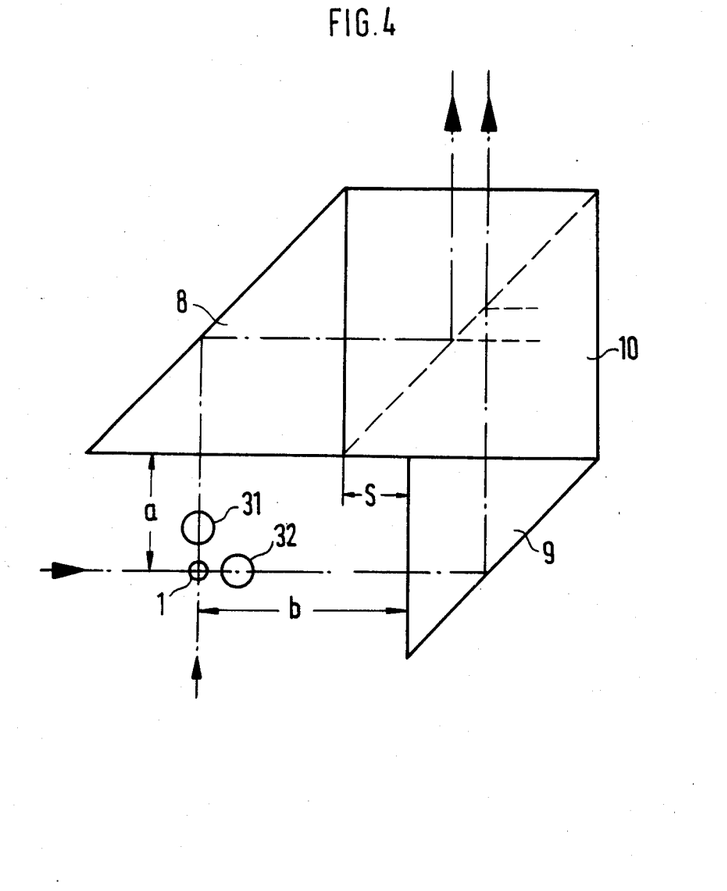

One such arrangement is shown in FIG. 4. The optical waveguide 1 is irradiated from two mutually perpendicular directions with parallel light which, in the drawing, is denoted by the arrows and the dot-and-dash lines. The light path extends through the two rod lenses 31 and 32, and the two images are deflected in such a way by the prism array as shown in the drawing, that finally there will be obtained two juxtaposed sharp images of the optical waveguide and its core. In this way it is possible to clearly detect the spatial position of both the optical waveguide and the core. Likewise, it is possible to detect the spatial position of the end of a second optical waveguide and its core. By the spatial displacement of the one optical waveguide, both optical waveguide ends can be spatially aligned in such a way with respect to one another that the two cores assume the optimum spatial position in relation to each other.

The arrangement as shown in FIG. 4 uses two prisms 8 and 9, with the edges thereof having different lengths. The two prisms 8 and 9 are applied to a beam splitter cube 10. The spacing of the face of the prism 8 from the optical waveguide 1 is indicated by the letter a in FIG. 4, while the spacing of the optical waveguide 1 from the prism 9 is indicated by the letter b. The letter s indicates the difference between the edge lengths of the two prisms 8 and 9. From this the following relationship results:

$$b - a = s/n$$

In this relationship n indicates the refractive index of the material of the two prisms. The spacing g of the centers of the two images at the output of the optical arrangement results from the relationship:

$$g = (1 - 1/n) \cdot s$$

Thus, when both equations are solved, it will be seen that n depends on the values of s, b and a and therefore g will only depend on the values of s, b and a.

With the arrangement according to FIG. 4 it is achieved that the two images of the optical waveguide 1 and its core can be observed next to each other.

The arrangement according to FIG. 4 can be modified in that the two prisms 8 and 9 are made equally large, but consist of a material having a different refractive index.

Figure 5:
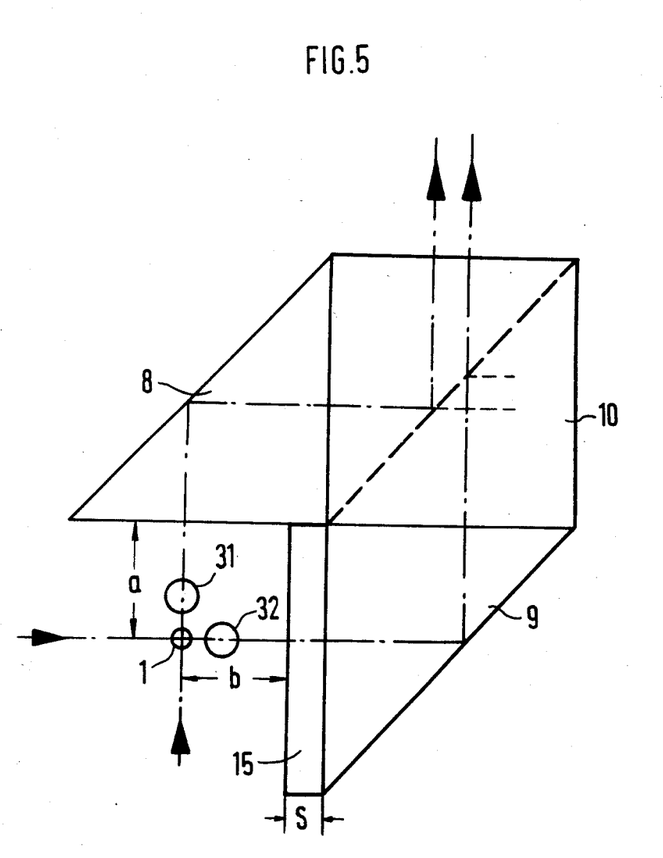

The optical arrangement as shown in FIG. 5 resembles the one as shown in FIG. 4. Here, however, the two prisms 8 and 9 are equally large and consist of a material having the same refractive index. In front of the light entry surface of the prism 9, however, there is disposed a plano-parallel glass plate 15. The thickness s of this glass plate 15 is determined in accordance with the same relationship as the difference s of the difference in length of the two short faces of the prisms 8 and 9 as shown in FIG. 4.

Figure 6:
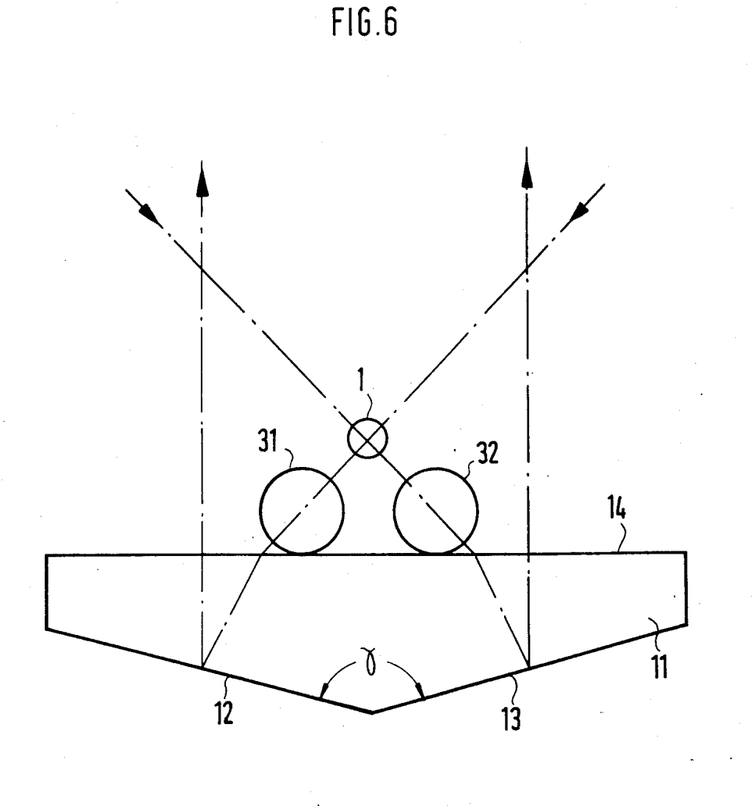

FIG. 6 schematically shows a further optical arrangement for producing two side-by-side images as resulting from the illumination of the optical waveguide from two mutually perpendicular directions. The optical waveguide 1 is transilluminated by the two light rays extending perpendicular to one another and indicated by the dot-and-dash lines in the drawing. The light rays emerging from the optical waveguide 1 pass through the two rod lenses 31 and 32 which are disposed on the base 14 of a roof prism 11. The two roof faces 12 and 13 of the roof prism 11 are mirrored, so that the two light rays are reflected at the roof faces and emerge in parallel in the upward direction. The wedge angle γ between the two roof faces 12 and 13 is chosen thus that the emerging light rays extend parallel in relation to one another. The height of the prism 11 is chosen thus that the two images of the optical waveguide are not affected by the rod lenses 31 and 32. The greater the height of the roof prism 11, the greater is the spacing between the two images. This spacing between the two images and, consequently, the height of the roof prism 11, of course, may only be chosen to be so large that the two light rays as emerging in the upward direction, can still be observed in a common optical system.

Instead of the roof prism 11 it is also possible to use two mirrors disposed in relation to one another at an angle γ. The preferred angle γ is 135°.

The base 14 of the roof prism 11 as well as, preferably, all light entry surfaces of the other optical component parts of the arrangements according to the invention are provided with an antireflection coating, so as to avoid disturbing reflections.

Figure 7A:
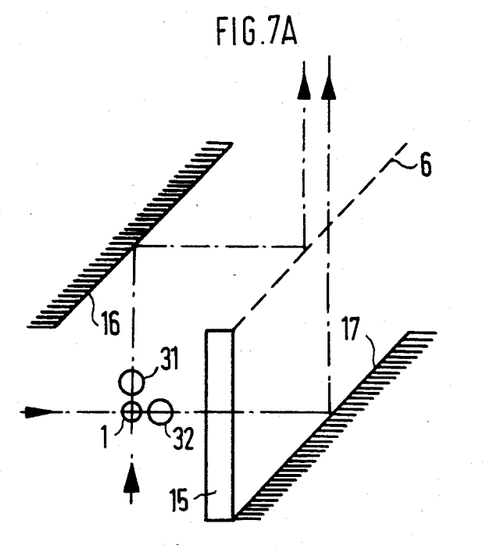
FIGS. 7A and 7B show two different optical arrangements producing two images of an optical waveguide from two mutually perpendicular directions, with the aid of mirrors.
Figure 7B:
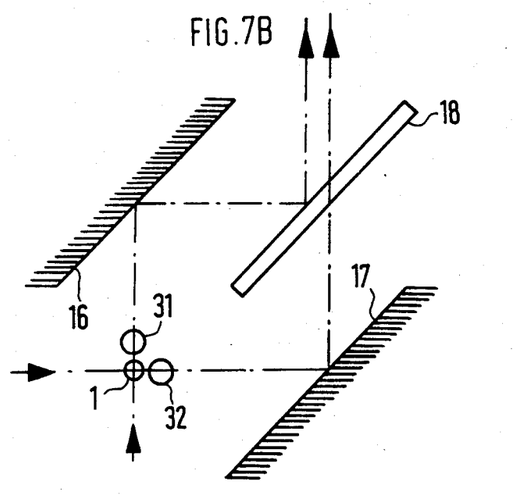

Two further optical arrangements employing mirrors are schematically shown in FIGS. 7A and 7B. Also in these arrangements, the optical waveguide 1 is illuminated by two light rays extending perpendicular to one another and which, in the direction of the light, extend behind the optical waveguide through the two rod lenses 31 and 32. In these arrangements the light rays as emerging from the rod lenses 31 and 32 are reflected by two plane mirrors 16 and 17 arranged parallel in relation to one another and facing each other with their mirrored surfaces. In the arrangement as shown in FIG. 7A a beam splitter foil 6 is disposed between the plane mirrors 16 and 17, parallel in relation thereto. The focusing of the right-hand partial image is effected in the arrangement according to FIG. 7A by the plano parallel glass plate 15.

In the arrangement as shown in FIG. 7B, instead of the beam splitter foil 6, there is provided a beam splitter plate 18 which, additionally, takes care of setting the suitable ray path.

Illumination is preferably effected with monochromatic light. In this way it is possible to improve the contrast. There is either used a corresponding light source or else suitable color filters are disposed within the ray path.

For producing two parallel light rays serving the illumination of the optical waveguide 1 it is possible to use different light sources, preferably, however, there is used one single light source, with the two light rays extending perpendicular to one another, being obtained with the aid of suitable optical means. In this way it is safeguarded that the two images to be observed, are of the same brightness.

By using the arrangement according to the invention, the spatial position of the cores of optical waveguides can be viewed in a simple way.

The arrangement according to the invention is preferably used for mutually aligning two optical waveguides with respect to their cores. This is necessary, for example, for achieving the optimum alignment of the ends of optical waveguides which are to be joined to one another. In this case, two of the arrangements described hereinbefore are used, with the end of the one optical waveguide being disposed displaceably with respect to the end of the other optical waveguide. Under constant observation, the end of the one optical waveguide is now displaced in such a way that finally the cores of the two optical waveguides are in an optimum alignment with respect to each other. The arrangement according to the invention may also form part of a splicing device for joining optical waveguides.

We claim:
1. An optical fiber apparatus comprising:
an optical waveguide having a core therein;
an irradiation source mounted adjacent said waveguide to provide light rays to said waveguide along mutually perpendicular light paths which pass through said waveguide;
two optical elements, each positioned in a respective light path between said irradiation source and said waveguide, each of said elements receiving light rays from said respective source and transmitting the rays in a parallel bundle to said waveguide;
two rod lenses, each being positioned in a respective light ray path emerging from said waveguide; and
means for deflecting the light rays emerging from said rod lenses so that the lengths of the light paths of both rays are substantially the same and produce two adjacent images in order to determine the spatial position of the waveguide and the core.
2. The apparatus as claimed in claim 1, wherein said rod lenses are designed as cylindrical lenses.
3. The apparatus as claimed in claim 2, wherein each of said rod lenses has two oppositely arranged flat extensions extending in the longitudinal direction.
4. The apparatus as claimed in claim 1, wherein said rod lenses are designed as planoconvex lenses.
5. The apparatus as claimed in claim 1, wherein said rod lenses are designed as biconvex lenses.
6. The apparatus as claimed in claim 1, wherein said rod lenses are designed as aspherical lenses.
7. The apparatus as claimed in claim 1, wherein said deflecting means includes a beam splitter cube and two prisms which are each disposed on one surface of said beam splitter cube.
8. The apparatus as claimed in claim 7, wherein said prisms have different configurations.
9. The apparatus as claimed in claim 7, wherein said prisms are made from materials having different refractive indices.
10. The apparatus as claimed in claim 7, wherein one of said prisms has a light entry surface and wherein said deflecting means further includes, a plano-parallel glass plate disposed in front of said surface.
11. The apparatus as claimed in claim 1, wherein said deflecting means includes two parallel mirrors facing one another with their reflecting surfaces.
12. The apparatus as claimed in claim 11, wherein said deflecting means further includes a beam splitter foil between said mirrors and, in the path of the light rays, a plano-parallel glass plate disposed in front of one of said plane mirrors perpendicularly to the light rays.
13. The apparatus as claimed in claim 11, wherein said deflecting means further includes a beam splitter plate disposed between the plane mirrors and parallel in relation thereto.
14. The apparatus as claimed in claim 1, wherein said deflecting means includes two plane mirrors which are edgewisely adjacent and disposed at an angle of 135° in relation to one another.

15. The apparatus as claimed in claim 1, wherein said deflecting means includes a roof prism which is silvered on the roof faces, with the rod lenses being applied to the base of the roof prism.

16. The apparatus as claimed in claim 1, wherein the light entry surfaces of the deflecting means are provided with an optical antireflection coating.

17. The apparatus as claimed in claim 1, wherein said irridiation source includes a monchromatic light.

18. An arrangement as claimed in claim 1 characterized in that for the illumination from two mutually perpendicular directions, there is provided one single light source (4).

19. The apparatus of claim 1 further comprising:
an additional optical waveguide having a core therein;
an additional irradiation source mounted adjacent said additional waveguide to provide light rays to said additional waveguide along mutually perpendicular light paths which pass through said waveguide;
two additional optical elements, each positioned in a respective light path between said irradiation additional source and said additional waveguide, each of said additional elements receiving light rays from said respective source and transmitting the rays in a parallel bundle to said additional waveguide;
two additional rod lenses, each being positioned in a respective light ray path emerging from said additional waveguide; and
means for deflecting the light rays emerging from said additional rod lenses so that the lengths of the light paths of both rays are substantially the same and produce two adjacent images, in order to mutually adjust the cores of said optical waveguide and said additional optical waveguide.

* * * * *